United States Patent
Guo et al.

(10) Patent No.: US 10,726,277 B2
(45) Date of Patent: Jul. 28, 2020

(54) LANE LINE DETECTION METHOD

(71) Applicant: NATIONAL CHIAO TUNG UNIVERSITY, Hsinchu (TW)

(72) Inventors: Jiun-In Guo, Hsinchu (TW); Yi-Ting Lai, Taichung (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 133 days.

(21) Appl. No.: 16/109,750

(22) Filed: Aug. 23, 2018

(65) Prior Publication Data
US 2019/0279003 A1    Sep. 12, 2019

(30) Foreign Application Priority Data
Mar. 6, 2018 (TW) ............................ 107107488 A

(51) Int. Cl.
G06K 9/00 (2006.01)
(52) U.S. Cl.
CPC ................................ G06K 9/00798 (2013.01)
(58) Field of Classification Search
None
See application file for complete search history.

(56) References Cited

U.S. PATENT DOCUMENTS

| | | | |
|---|---|---|---|
| 5,922,036 A | 7/1999 | Yasui et al. | |
| 6,091,833 A | 7/2000 | Yasui et al. | |
| 8,244,410 B2* | 8/2012 | Wu | B60Q 9/008 340/436 |
| 9,081,385 B1* | 7/2015 | Ferguson | G06K 9/00798 |
| 2008/0310717 A1 | 12/2008 | Saathoff et al. | |
| 2012/0057757 A1* | 3/2012 | Oyama | G06K 9/00798 382/104 |
| 2012/0194677 A1* | 8/2012 | Suzuki | G06K 9/00798 348/148 |
| 2014/0185879 A1* | 7/2014 | Sohn | G06T 7/11 382/103 |

FOREIGN PATENT DOCUMENTS

| | | |
|---|---|---|
| CN | 101470807 A | 7/2009 |
| CN | 107097794 A | 8/2017 |
| JP | 2006209209 A | 8/2006 |
| TW | I268878 B | 12/2006 |
| TW | 200838750 A | 10/2008 |
| TW | I306816 B | 3/2009 |

OTHER PUBLICATIONS

JP,2018-169947,machine translation ; (Mar. 30, 2017) Yamada Tadashi Machine translation (Year: 2017).*

* cited by examiner

*Primary Examiner* — Nancy Bitar
(74) *Attorney, Agent, or Firm* — CKC & Partners Co., LLC

(57) ABSTRACT

A lane line detection method including following steps: acquiring an original image by an image capture device, in which the original image includes a ground area and a sky area; setting a separating line between the sky area and the ground area in the original image; measuring an average intensity of a central area above the separating line, and deciding a weather condition according to the average intensity; setting a threshold according to the weather condition, and execute a binarization process according to the threshold to an area below the separating line to obtain a binary image; and using a line detection method to detect a plurality of approximate lane lines in the binary image.

16 Claims, 9 Drawing Sheets

LANE LINE DETECTION METHOD

CROSS-REFERENCE TO RELATED APPLICATION

This application claims priority to Taiwan Application Serial Number 107107488, filed Mar. 6, 2018, which is herein incorporated by reference.

BACKGROUND

Field of Invention

The present invention relates to a lane line detection method.

Description of Related Art

Automatic vehicles, or driverless vehicles, are a new trend in transportation. Image recognition methods are correspondingly developed to help the programmed pilot to make decision based on environmental information. The image recognition methods may also be applied to normal vehicles, to monitor the safety degree of a driving situation, and warn the driver according to preset conditions.

However, several difficulties are encountered in the development of the image recognition method, one of which is that the designed detection and recognition may fail as the environment changes. As a result, it is imperative to develop an image recognition method that is adaptable to different environment conditions in the industry.

SUMMARY

The invention provides a lane line detection method, which includes following steps: acquiring an original image by an image capture device, in which the original image includes a ground area and a sky area; setting a separating line between the sky area and the ground area in the original image; measuring an average intensity of a central area above the separating line, and deciding a weather condition according to the average intensity; setting a threshold according to the weather condition, and execute a binarization process according to the threshold to an area below the separating line to obtain a binary image; and using a line detection method to detect a plurality of approximate lane lines in the binary image.

In sum, the provided lane line detection method may be applied under different weather conditions, and road objects or noises may be excluded from the image before the lane lines detection, which would result in a better detection accuracy and efficiency. In addition, the time complexity of the algorithm is linear, and thus the detecting result may be obtained in real-time.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3B illustrates a flow diagram of the threshold extraction process in

FIG. 3A; and

DETAILED DESCRIPTION

Figure 1:
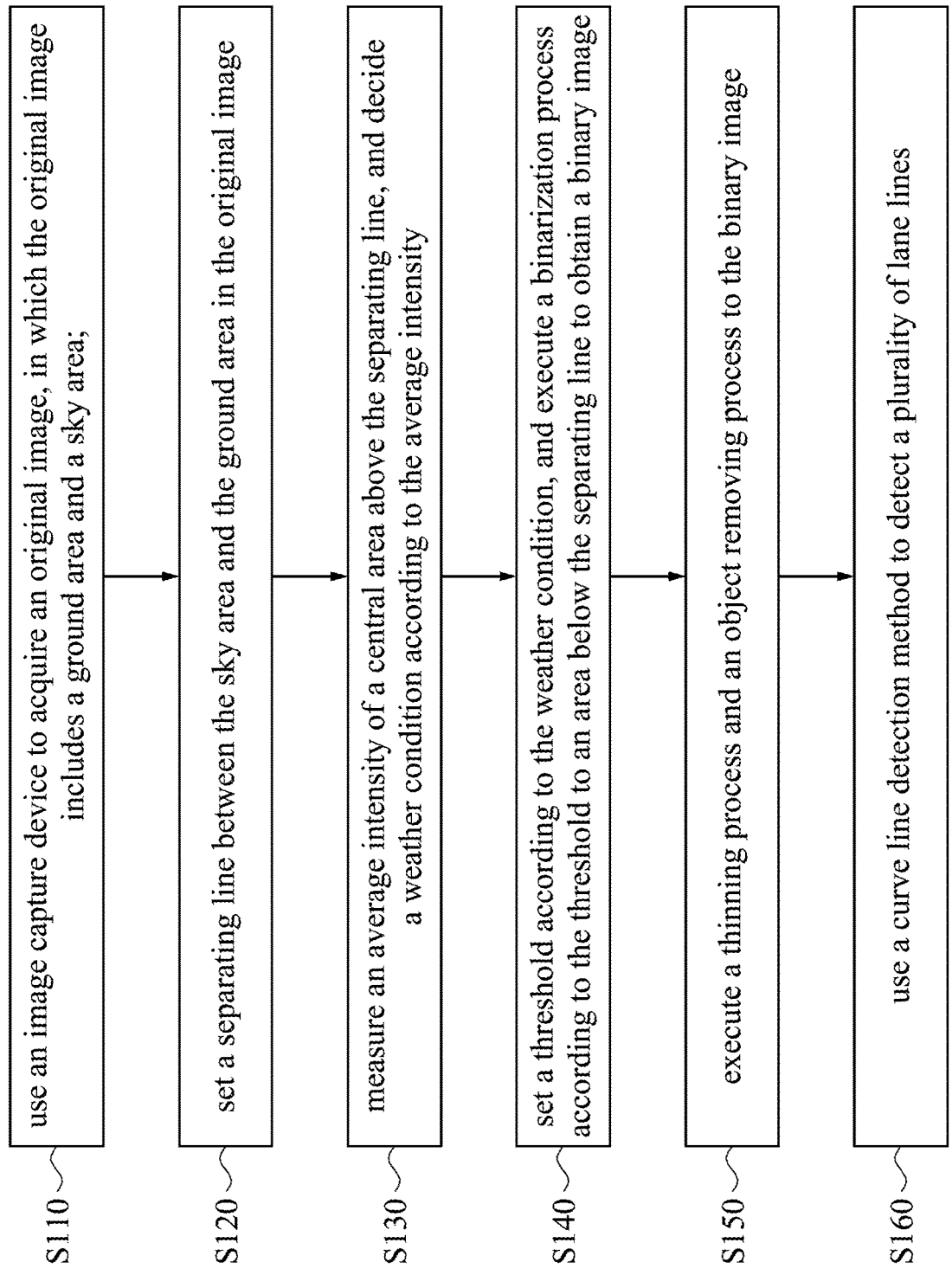
FIG. 1 illustrates a flow diagram of a lane line detection method according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1, which illustrates a flow diagram of a lane line detection method 100 according to an embodiment of the present disclosure. In the present embodiment, the lane line detection method 100 includes step S110 to step S160. The lane line detection method 100 starts from step S110: using an image capture device to acquire an original image, in which the original image includes a ground area and a sky area; then proceeds with step S120: setting a separating line between the sky area and the ground area in the original image; and then proceeds with step S130: measuring an average intensity of a central area above the separating line, and decide a weather condition according to the average intensity; and then proceeds with step S140: setting a threshold according to the weather condition, and execute a binarization process according to the threshold to an area below the separating line to obtain a binary image; and then proceeds with step S150: executing a thinning process and an object removing process to the binary image; and at the end proceeds with step S160: using a curve line detection method to detect a plurality of lane lines.

The lane line detection method 100 provided by the present disclosure may detect lane lines in the original image (captured by the image capture device) in real-time. In detecting process, parameters are set according to a weather condition, and thus lane lines are detected in good accuracy even in different weather conditions. Details in lane line detection method 100 would be described with references made to FIG. 2A to FIG. 2E as follow.

Figure 2A:
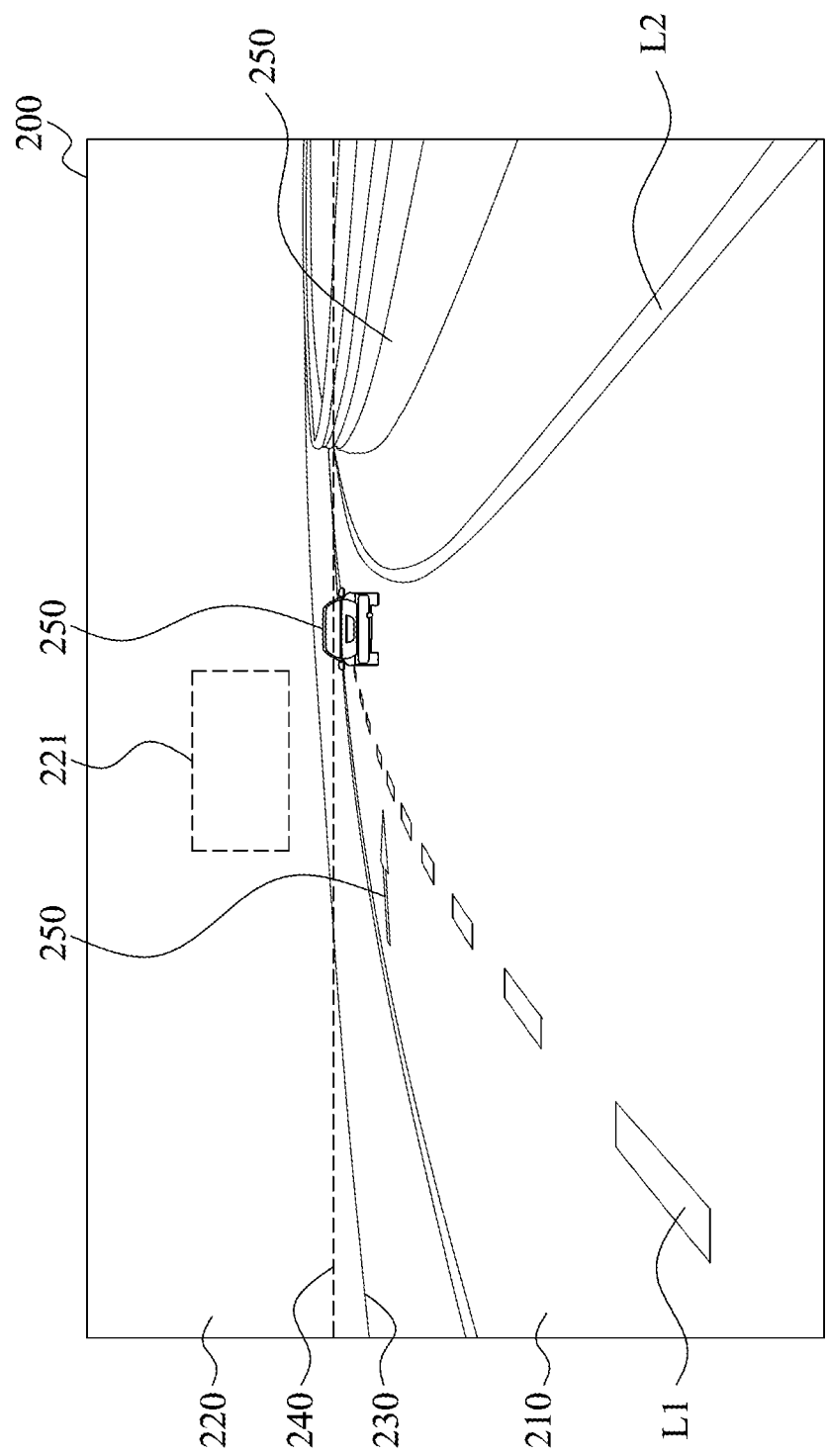
FIG. 2A illustrates a schematic diagram of a step of the lane line detection method shown in FIG. 1.

Please refer to FIG. 1 and FIG. 2A, in which FIG. 2A illustrates a schematic diagram of a step of the lane line detection method 100 shown in FIG. 1. The lane line detection method 100 starts from step S110: using an image capture device to acquire an original image 200. In the present embodiment, the image capture device may be a driving recorder installed in a center of a front of a vehicle. In some embodiment, the image capture device may be installed in a right or left side of a front of a vehicle. According to practice, a vertical axis may be preset to represent the center of the vehicle in the original image 200, and the vertical axis corresponding to a central axis of the original image 200 shown in FIG. 2A. Other pre-processing of the original image 200 may also be adopted, and the present disclosure is not limited thereto.

When the vehicle moves on the road, the original image 200 may include a ground area 210, a sky area 220, a left lane line L1, a right lane line L2, and a plurality of other objects 250. A junction between the ground area 210 and the sky area 220 is called a junction line 230 herein. As the vehicle moves on the road, a distance between the road and the image capture device is fixed, and an angle between the road and a lens of the image capture device is fixed, and thus the relative position of the ground area 210 and the sky area 220 in the original image 200 would also be fixed. In other words, the height and shape of the junction line 230 of the original image 200 barely change when original image 200 is captured in different timing.

As shown in FIG. 1 and FIG. 2A, the lane line detection method 100 proceeds with step S120: setting a first separating line 240 between the ground area 210 and the sky area 220, so as to separate the ground area 210 and the sky area 220 in the original image 200. In the present embodiment, because the height of the junction line 230 is generally fixed, a horizontal straight line is used as the first separating line 240 to approximate the junction line 230. In some embodiments, the first separating line 240 is set above the junction line 230, so as to ensure the ground area 210 is entirely located below the first separating line 240 in the original image 200.

In some embodiments, the height of the first separating line 240 in the original image 200 may be set manually. Or in other embodiments, junction detecting methods may be implemented to automatically detect the junction line 230, and then directly set the junction line 230 to be the first separating line 240.

As shown in FIG. 1 and FIG. 2A, the lane line detection method 100 proceeds with step S130: measuring an average intensity of a central area 221 of the sky area 220 above the first separating line 240 in the original image 200, and determining a weather condition according to the average intensity. The central area 221 may be an area within the sky area 220 in the original image 200, in which the area is unlikely to be affected by other objects such as buildings, sign lights, street lights, etc. In particular, the central area 221 may be a rectangular area defined above the first separating line 240, and a width of the rectangular area is equal to half of a width of the original image 200. In other words, the central area 221 is located in a range from 25% width to 75% width of the original image 200. In other embodiments, the central area 221 may have an arbitrarily size, and may be located in other positions in the sky area 220. For example, entire area above the first separating line 240 may be set as the central area 221, and thus steps setting size or position of the central area 221 may be omitted.

In different periods of a day, an intensity of the sky area 220 may vary, and different weather conditions may also affect the intensity of the sky area 220. As a result, in the step S130, weather condition of a time may be determined by an intensity of the central area 221 of the sky area 220. In the present embodiment, an image depth of the original image 200 is 256 steps, which means the intensity may have a value from 0 to 255. In the present embodiment, if an average intensity of the central area 221 is greater than 110, then the weather condition is determined to be daytime; else if the average intensity of the central area 221 is in a range from 50 to 110, then the weather condition is determined to be cloudy time; else if the average intensity of the central area 221 is smaller then 50, then the weather condition is determined to be nighttime. In other embodiments, the numerical value used to determine the weather condition may be set according to practice, and the present disclosure is not limited thereto.

Figure 2B:
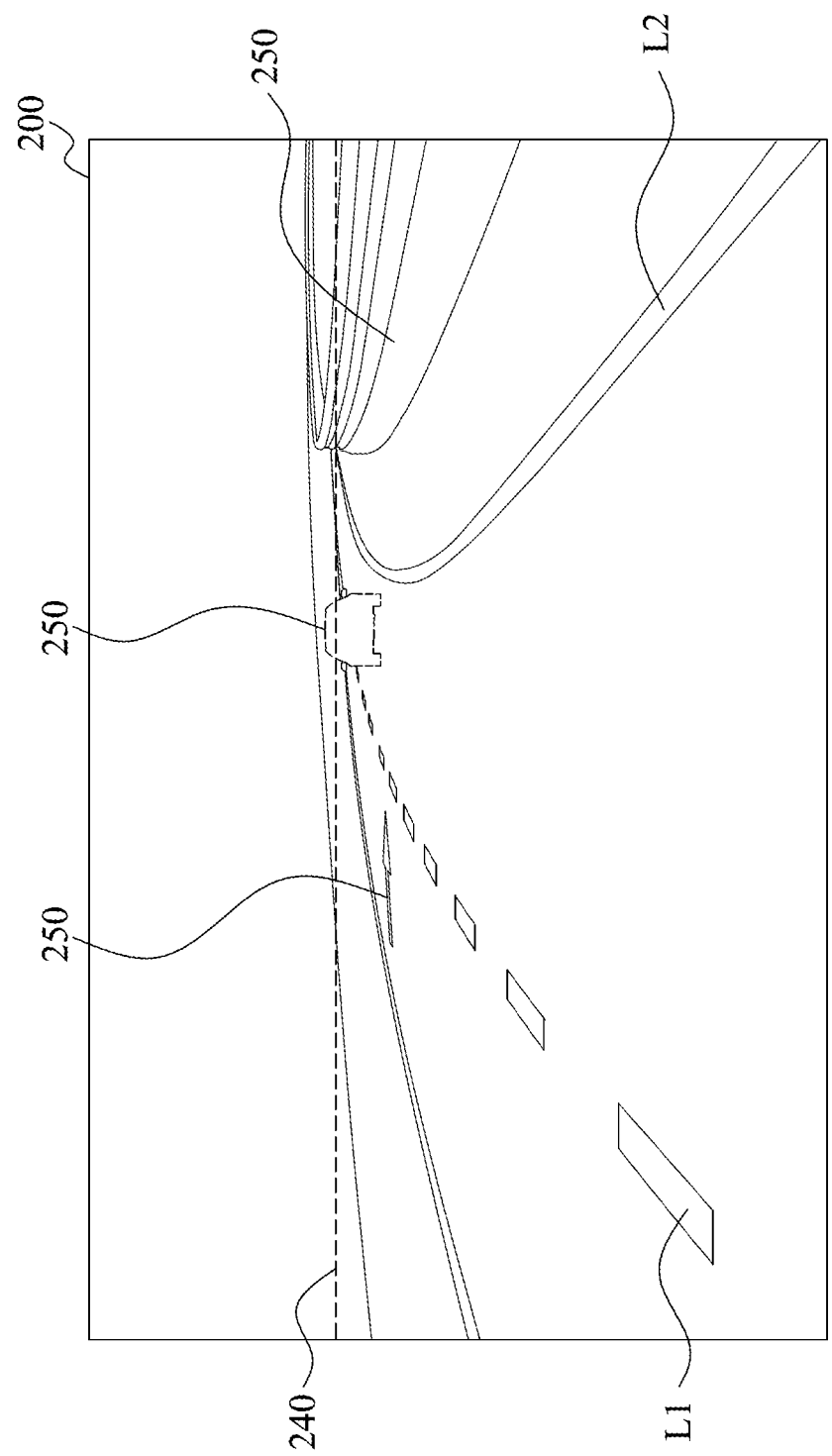
FIG. 2B illustrates a schematic diagram of a step of the lane line detection method shown in FIG. 1.

Please refer to FIG. 1 and FIG. 2B, in which FIG. 2B illustrates a schematic diagram of another step of the lane line detection method 100 shown in FIG. 1. After the step S130, the lane line detection method 100 proceeds with step S140: setting a threshold according to the weather condition, and executes a binarization process to an entire area below the first separating line 240 in the original image 200 to obtain a binary image 300. In practice, the left lane line L1 and the right lane line L2 are both with white color, and thus intensity of the two would be greater than other parts in the ground area 210 (for example, some of the other objects 250 such as trees, hand rail, etc.). In the present embodiment, the binarization process may be a threshold extraction process, so as to extract high intensity target such as the left lane line L1 and the right lane line L2, and filter out other objects 250 with low intensity (the filtered out objects are illustrated in dot line). In some cases as shown in FIG. 2B, some objects 250 with high intensity are not removed in the step S140, and thus stay in the area below the first separating line 240.

Figure 3A:
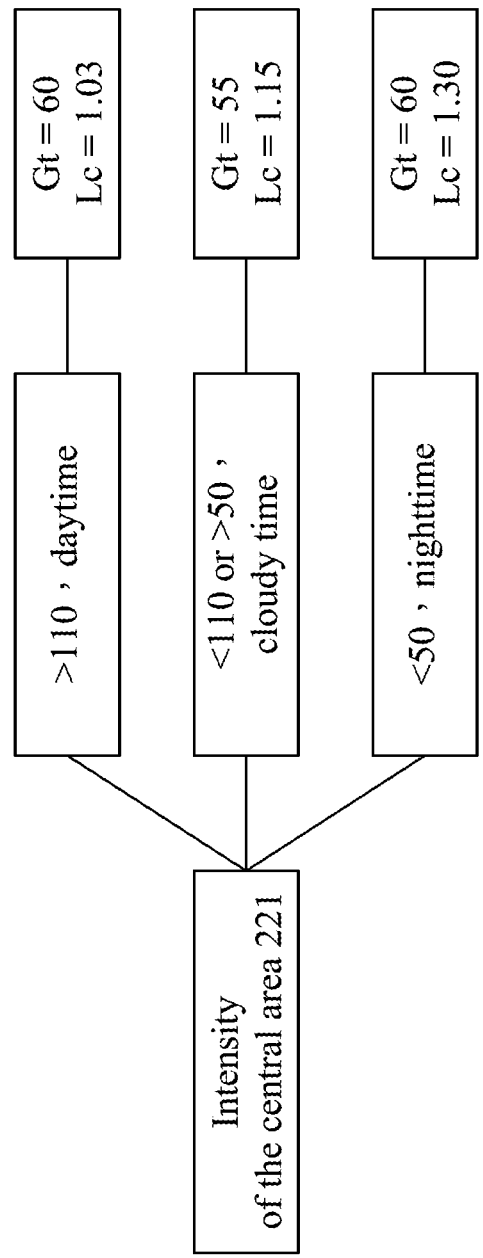
FIG. 3A illustrates a flow diagram of a threshold setting process of a threshold extraction method implemented in the lane line detection method according to an embodiment of the present disclosure.
Figure 3B:
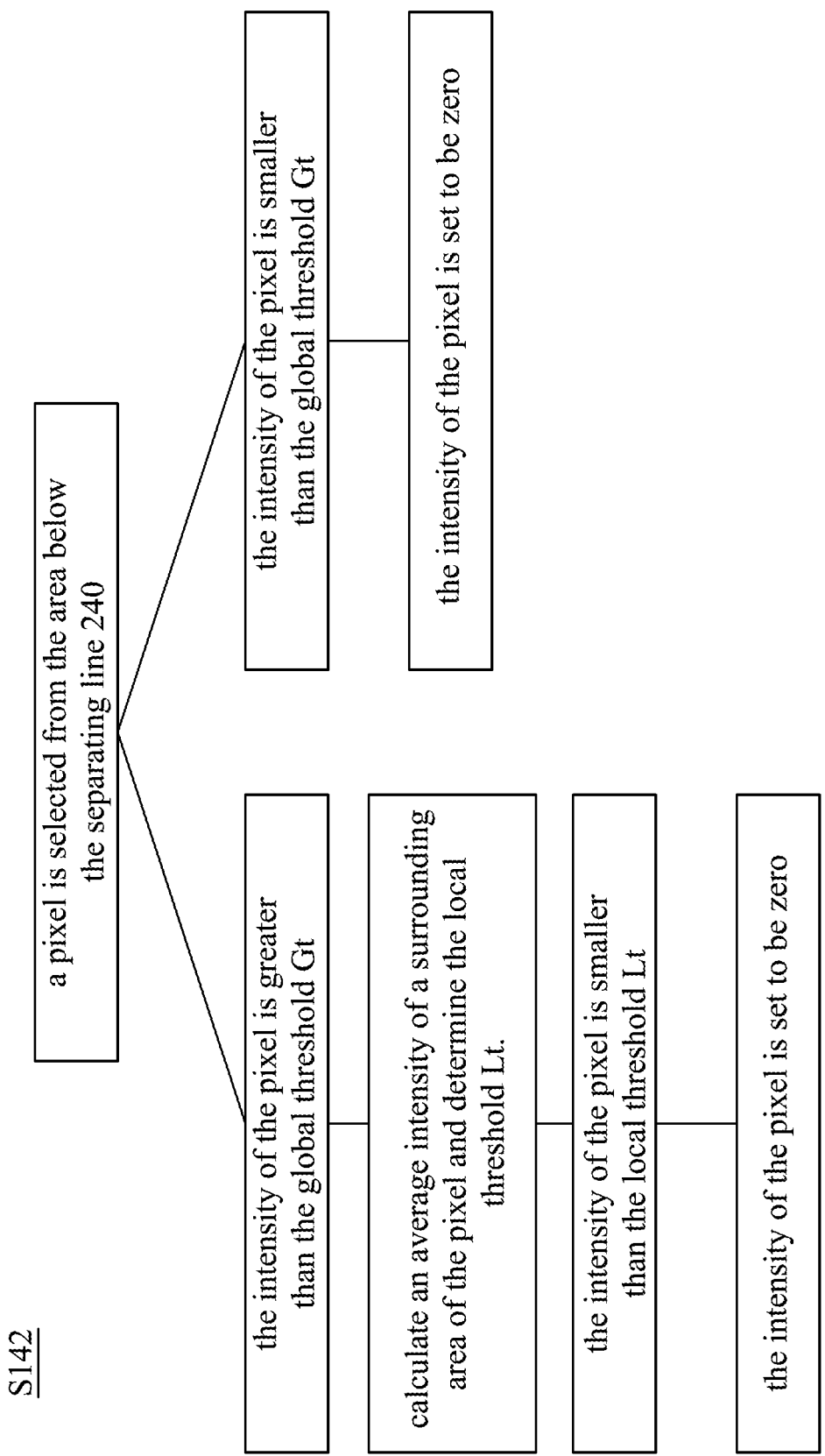

Regarding the binarization process implemented in the present embodiment, please refer to FIG. 3A and FIG. 3B. FIG. 3A illustrates a flow diagram of a threshold setting process of the threshold extraction method implemented in the lane line detection method 100 according to an embodiment of the present disclosure; and FIG. 3B illustrates a flow diagram of the threshold extraction process in FIG. 3A. As shown in FIG. 3A and FIG. 3B, the threshold extraction method in step S140 includes step S141 to step S143.

As shown in FIG. 3A, the threshold extraction method starts from step S141: setting a threshold according to a weather condition obtained in step S130. In the present embodiment, the threshold includes a global threshold Gt, a local threshold coefficient Lc, and a local threshold Lt. When the weather condition is determined to be daytime, the global threshold Gt is set to be 60, and the local threshold coefficient Lc is set to be 1.03; when the weather condition is determined to be cloudy time, the global threshold Gt is set to be 55, and the local threshold coefficient Lc is set to be 1.15; and when the weather condition is set to be nighttime, the global threshold Gt is set to be 50, and the local threshold coefficient Lc is set to be 1.30. In other embodiments, the threshold value may be set according to practice, and the present disclosure is not limited thereto.

Please refer to FIG. 3B, the threshold extraction method proceeds with step S142: changing an intensity of each pixel in an area below first separating line 240 according to the global threshold Gt and the local threshold coefficient Lc set in step S141. In step S142, a pixel is selected from the area below the first separating line 240 at first, and then it is determined by an intensity of the pixel that whether the pixel belongs to the left lane line L1 or right lane line L2. In particular, if the intensity of the pixel is smaller than the global threshold Gt, then it is determined that the pixel neither belong to the left lane line L1 nor the right lane line L2, and the intensity of the pixel is set to be 0; and else if the pixel has an intensity greater than the global threshold Gt, then it is possible that the pixel belongs to the left lane line L1 or right lane line L2. In the case, further check if the pixel has a relative high intensity with respect to a surrounding area of the pixel, in which the surrounding area takes the pixel as center. In particular, an average intensity of the surrounding area is multiplied by the local threshold coefficient Lc, and the resulting value is defined as the local threshold Lt. If the intensity of the pixel is smaller than the local threshold Lt, then it is determined that neither the pixel neither belongs to the left lane line L1 nor the right lane line L2, and then the intensity of the pixel is set to be 0. After the step S142, some of the objects 250 may be filtered out, and high intensity noise with small area may also be filtered out.

In particular, the surrounding area in step S142 may be a 3 by 3 grid, a crisscross area, or area with other shape or size that takes the pixel as center. In the present embodiment, the shape of the surrounding is defined as a square, and the size of the square is proportional to a distance between the pixel and the first separating line 240. For example, the larger of the distance between the pixel and the first separating line 240, the larger of a side length of the square; and the smaller of the distance between the pixel and the first separating line 240, the smaller of a side length of the square. In the original image 200, portions of the lane lines closer to the first separating line 240 would be thinner, and portions of the lane lines farther to the first separating line 240 would be wider, and thus by setting the size of the square proportional to the distance between the pixel and the first separating line 240, it may be more accurately determined whether a pixel belong to the left lane line L1 or right lane line L2 in the step S142. In particular, if the pixel is separated from the first separating line 240 by d pixels, then the side length of the square is set to be d*C, in which C is a constant set according to practice.

Figure 2C:
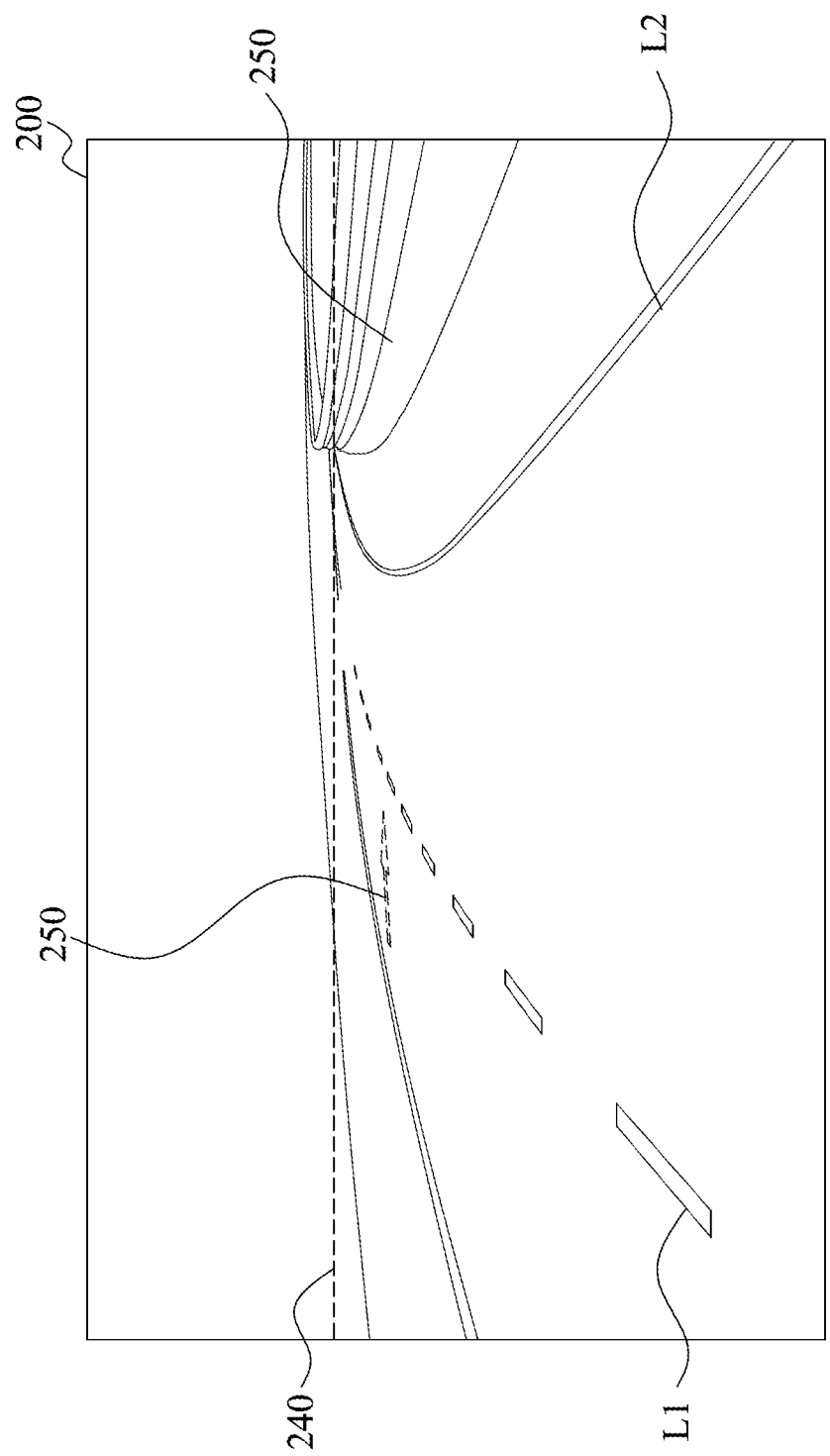
FIG. 2C illustrates a schematic diagram of a step of the lane line detection method shown in FIG. 1.

Please refer to FIG. 2C, which illustrates a schematic diagram of a step in the lane line detection method 100 shown in FIG. 1. After all pixels in the area below the first separating line 240 undergo the step S142, a binary image 300 is obtained. Next, the lane line detection method 100 proceeds with step S150: executing a thinning process and an object removing process. In the present embodiment, a lateral thinning process is implemented, and a lateral size of an object is measured in the lateral thinning process. If a lateral size of the object is too big or too small, then the object is removed.

Figure 4:
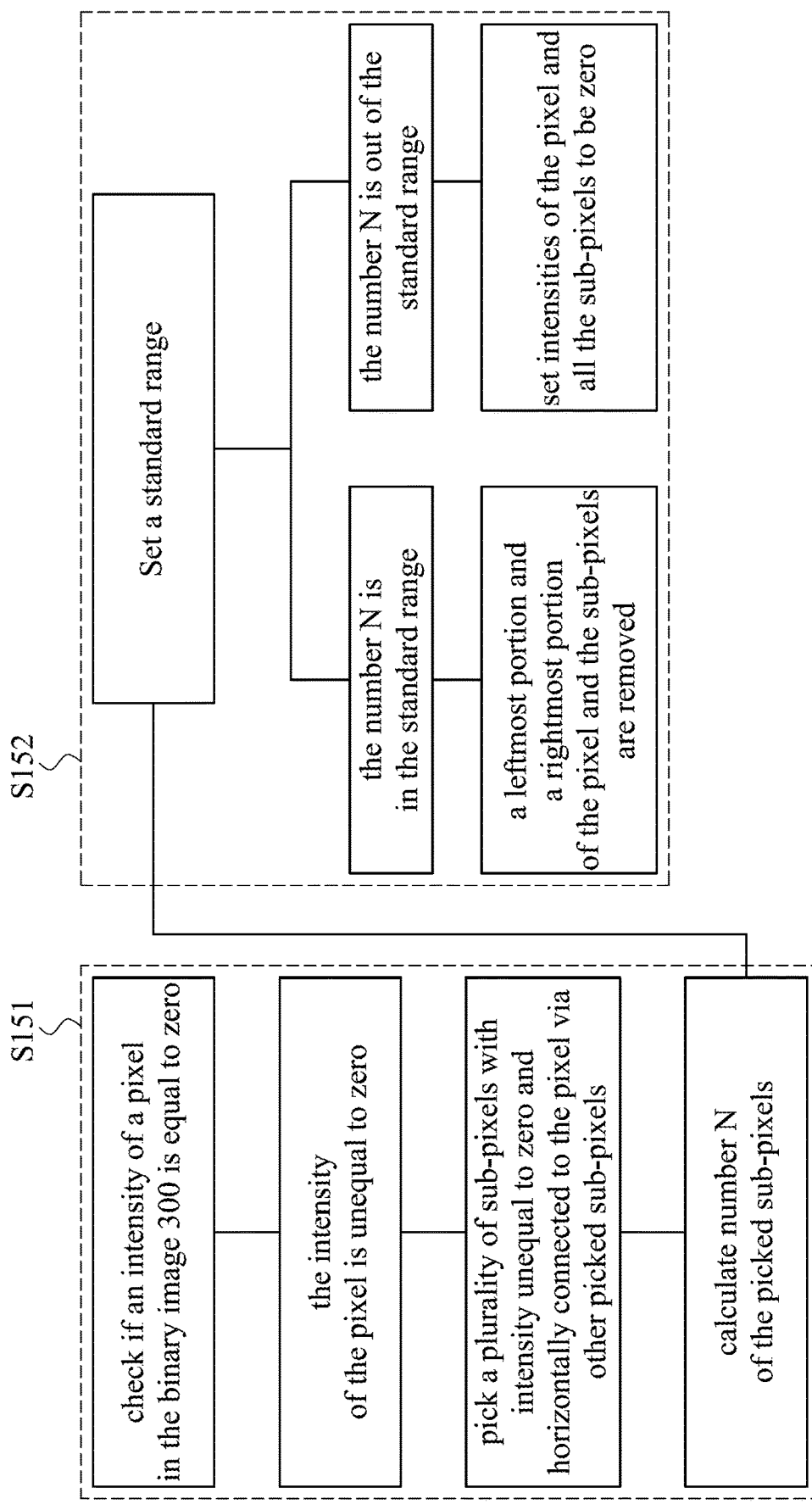
FIG. 4 illustrates a flow diagram of a thinning process and an object removing process implemented in the lane line detection method according to an embodiment of the present disclosure.

Regarding the lateral thinning process and the object removing process of the present embodiment, reference is also made to FIG. 4. FIG. 4 illustrates a flow diagram of the thinning process and the object removing process implemented in the lane line detection method 100 according to an embodiment of the present disclosure. As shown in FIG. 4, the thinning process and the object removing process includes step S151 to step S152.

As shown in FIG. 4, the thinning process and the object removing process first proceed with step S151: checking if an intensity of a pixel in the binary image 300 is equal to zero; if the intensity of the pixel is unequal to zero, then a plurality of sub-pixels which satisfies both of the following conditions is picked: (a). intensity of each sub-pixel is unequal to zero; and (b). each sub-pixel is horizontally connected to the pixel via other picked sub-pixels; and then calculate how many sub-pixels are picked, and the number of picked sub-pixels N obtained in step S151 denotes a lateral width of an object in the binary image 300.

Next, the thinning process and the object removing process proceed with step S152: executing line thinning and object removal. As shown in original image 200 of FIG. 1, a lateral width of the left lane line L1 and the right lane line L2 would be varied in a certain range, and thus by examining whether the number N is in a standard range, it may be determined that whether the pixels and picked sub-pixels belong to the left lane line L1 or the right lane line L2.

In the present embodiment, the standard range is set to be 4 to 50. As a result, if the number N is in the range from 4 to 50, then it is determined that the pixel and sub-pixels belong to the left lane line L1 or the right lane line L2, and a leftmost portion and a rightmost portion of those pixels (the pixel and the sub-pixels) are removed, and only a central portion of them remains. For example, half of those pixels are removed while keeping the center of those pixels unchanged. Comparing FIG. 2B and FIG. 2C, it may be observed that after the thinning process, the left lane line L1 shown in FIG. 2C is thinner than the left lane line L1 shown in FIG. 2B, the same as the right lane line L2. However, if the number N is less than 4 or greater than 50, then those pixels are determined belonging to other objects, and an object removing process is executed. The object removing process includes: setting intensities of all those pixels to be zero. After the step S152, some other objects 250 with intensities similar to the left lane line L1 or the right lane line L2, but with an inadequate sized may be removed. In the present embodiment, after the step S150, a pre-processing of the binary image 300 is finished.

Figure 2D:
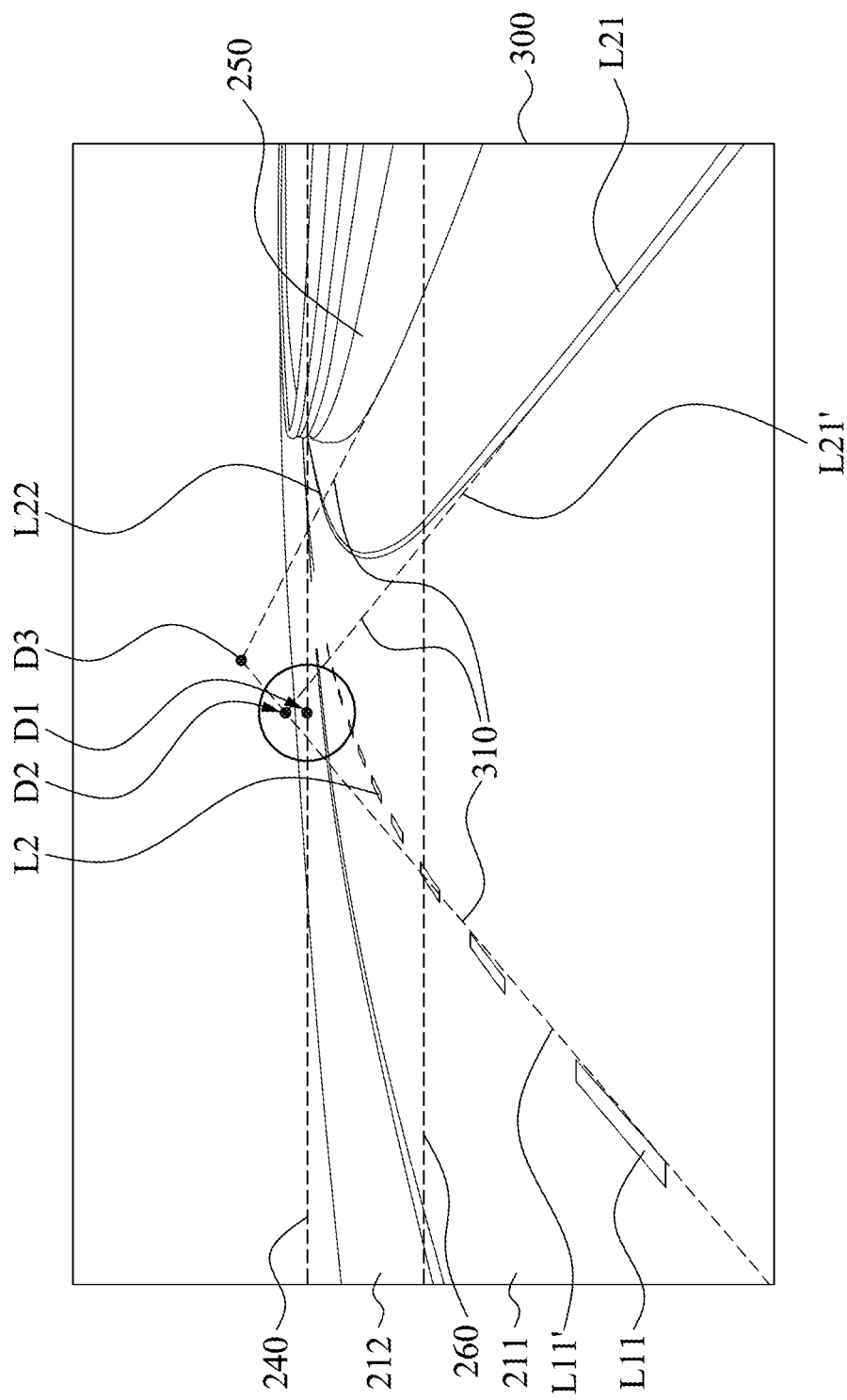
FIG. 2D illustrates a schematic diagram of a step of the lane line detection method shown in FIG. 1.
Figure 2E:
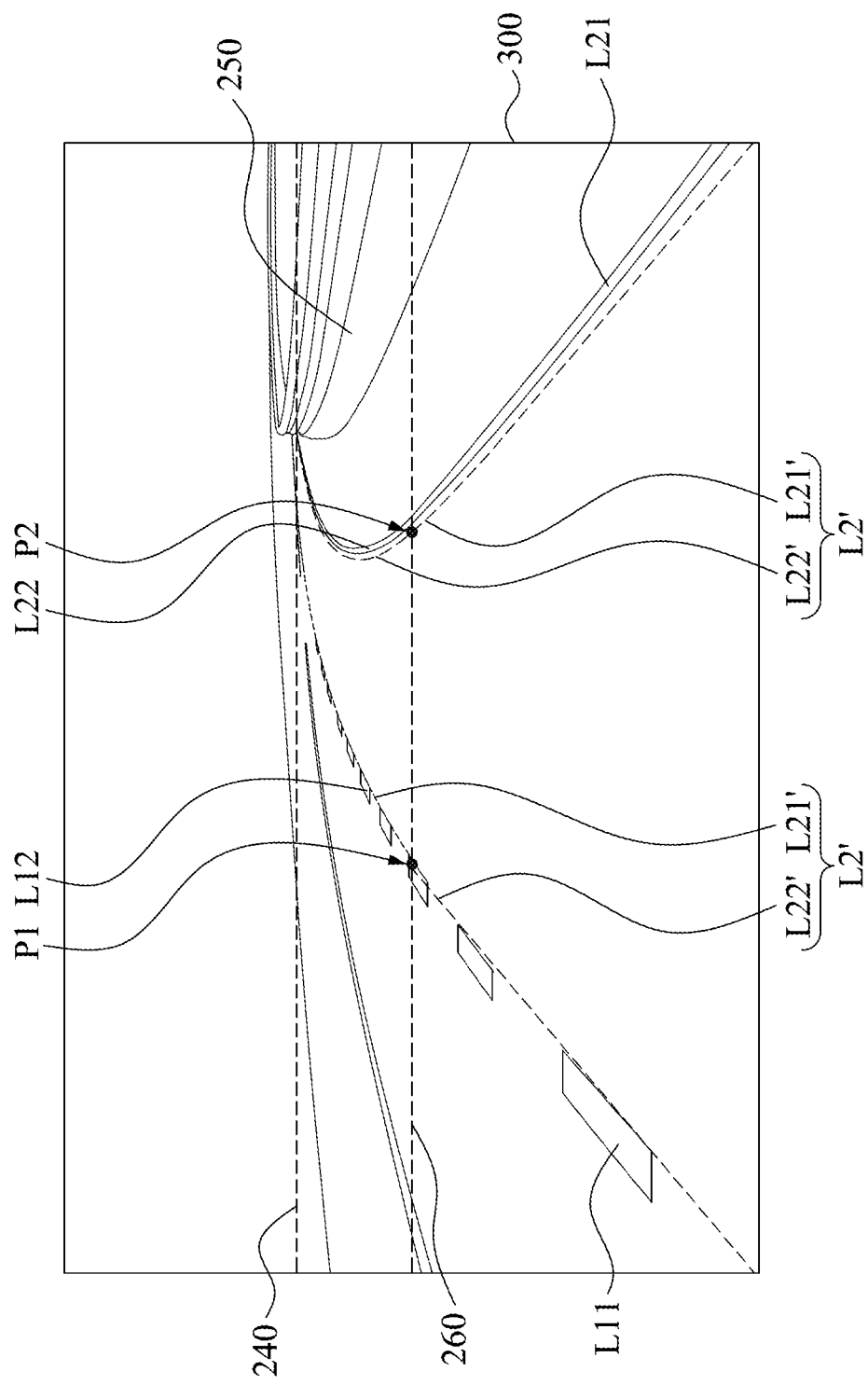
FIG. 2E illustrates a schematic diagram of a step of the lane line detection method shown in FIG. 1.

Please refer to FIG. 2D and FIG. 2E. FIG. 2D illustrates a schematic diagram of a step of the lane line detection method 100 shown in FIG. 1; and FIG. 2E illustrates a schematic diagram of another step of the lane line detection method 100 shown in FIG. 1. After step S150, the lane line detection method 100 proceeds with step S160: using a line detection method to the binary image 300, and obtain an approximate left lane line L1' and an approximate right lane line L2'. In the present embodiment, the binary image 300 is further divided into a near area 211 and a far area 212. A straight line detection method is applied to the near area 211, and a conic section detection method is applied to the far area 212, by such improving an accuracy and efficiency of the lane line detection method 100.

As shown in FIG. 2D, in particular, the near area 211 refers to portions of the left lane line L1 and the right lane line L2 which are straight lines in general, and the far area 212 refers to portions of the left lane line L1 and the right lane line L2 which are curve lines in general. In the present embodiment, a second separating line 260 is used to divide the binary image 300 into the near area 211 below the second separating line 260 and the far area 212 above the second separating line 260. The straight line portions of the left lane line L1 and the right lane line L2 intersect with the curve line portions of the left lane line L1 and the right lane line L2 at two intersecting points respectively. As the vehicle moving on the road, the height of the intersecting points barely change (the reason is similar to that described in paragraph with respect to the first separating line 240), and thus a horizontal straight line may be used to approximate the second separating line 260.

In particular, in the present embodiment, a distance between the second separating line 260 and a bottom of the binary image 300 is three times a distance between the second separating line 260 and the first separating line 240. In other words, an area of the near area 211 is three times an area of the far area 212.

After the second separating line 260 is set, the left lane line L1 would be divided into a near left lane line L11 in the near area 211 and a far left lane line L12 in the far area 212, and the right lane line L2 would be divided into a near right lane line L21 in the near area 211 and a far right lane line L22 in the far area 212.

As shown in FIG. 2D, the near area 211 below the second separating line 260 is applied with a straight line detection method. In the present embodiment, the straight line detection method may include Hough transforming. In other embodiments, other detection method may also be employed, and the present disclosure is not limited thereto.

As shown in FIG. 2D, after finishing the Hough transforming, plural near lane line candidates 310 are detected. As shown in FIG. 2D, an approximate near left lane line L11' and an approximate near right lane line L21' intersect at a point D1 located around a center of the junction line 230, and thus by checking if two of the near lane line candidates 310 intersect at a point located around a center of the junction line 230, it may be determined if the two near lane line candidates 310 represent the near left lane line L11 and the near right lane line L21.

In the present embodiment, whether a point is located around a center of the junction line 230 may be defined by a circular area, which is set with a radius R and centered on a point D2 located at a center of the first separating line 240. As shown in FIG. 2D for example, a near lane line candidate 310 generated by the other objects 250 intersect with a near lane line candidate 310 generated by the near left lane line L11 at a point D3, which locates outside of the circle area, and thus it is determined that an intersecting point of the two near lane line candidates 310 is not located around the center of the junction line 230. Else if two of the near lane line candidates 310 intersect at a point located within the circle area (for example, point D1), then the two near lane line candidates 310 are determined to be located around the center of the junction line 230, and then the near lane line candidate 310 at a left side of the binary image 300 is set to be the approximate near left lane line L11', and the near lane line candidates 310 at a right side of the binary image 300 is set to be the approximate near right lane line L21'. The radius R of the circle area may be set according to practice, for example, the radius R may equal to one eighth of the width of the binary image 300 in the present embodiment.

Next, as shown in FIG. 2E, a curve line detection method is applied to an area between the second separating line 260 and the first separating line 240. In the present embodiment, the curve line detection method may include hyperbola pairing. In other embodiments, other methods may also be employed, and the present disclosure is not limited thereto.

As shown in FIG. 2E, in the present embodiment, the intersecting point of the approximate near left lane line L11' and the second separating line 260 is set to be a fixed point P1, and the hyperbola pairing is applied base on the fixed point P1. By such, detected approximate far left lane line L12' would be connected to the approximate near left lane line L11'. In the same manner, the intersecting point of the approximate near right lane line L21' and the first separating line 240 is set to be a fixed point P2, and the hyperbola pairing is applied base on the fixed point P2, and thus a detected approximate far right lane line L22' would be connected to the approximate near right lane line L21'. As the approximate far left lane line L12' and the approximate near left lane line L11' are obtained, they are combined as the approximate left lane line L1'; and as the approximate far right lane line L22' and the approximate near right lane line L21' are obtained, they are combined as the approximate right lane line L2'.

After the approximate left lane line L1' and the approximate right lane line L2' are successfully extracted from the original image 200 by the lane line detection method 100, the approximate left lane line L1' and the approximate right lane line L2' are set to be default approximate lane lines for a while. In the present embodiment, the default approximate lane lines are hold for 5 frames, which means if, in the successive 5 frames the lane line detection method 100 fail to extract the approximate left lane line L1', and the approximate right lane line L2' from the original image 200, then the default approximate lane lines are automatically adopted as the approximate left lane line L1' and the approximate right lane line L2', and if the lane line detection method 100 successfully extract a new approximate left lane line L1' and a new approximate right lane line L2', then the newly obtained approximate lane lines are set to be the new default approximate lane line.

In some occasions, there may be a chance that all the near lane line candidates 310 fail to pass the determining process. For example, there may be no lane lines in some sections of the road, or when passing by a large truck, the lane lines may be temporarily blocked. At the timing exemplified above, the lane line detection method 100 may fail to extract the approximate left lane line L1' and the approximate right lane line L2' from the original image 200. The default approximate lane lines may function as a buffer, until the lane line detection method 100 successfully extracts the approximate left lane line L1' and the approximate right lane line L2'.

The lane line detection method 100 may be applied in various situations. For example, by measuring a distance between the approximate left lane line L1' (or the approximate right lane line L2') and the central axis of the original image 200, it may be determined whether the vehicle is driven offset from a normal driving path. In addition, in the present embodiment, curvatures of the lane lines may be obtained in the hyperbola pairing process, and the sign of the curvatures denotes the road in front of the vehicle is turning to the right or left, and the value of the curvatures denote the degree of turning. People skilled in the art may apply the lane line detection method 100 in different situations according to practice needs, and the present disclosure is not limited thereto.

In sum, the present disclosure provides a lane line detection method, which may be applied under different weather conditions, and road objects or noises may be excluded from the image before the lane lines detection, which would result in a better detection accuracy and efficiency. In addition, the time complexity of the algorithm is linear, and thus the detecting result may be obtained in real-time.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lane line detection method, comprising:
acquiring an original image by an image capture device, wherein the original image includes a ground area and a sky area;
setting a separating line between the sky area and the ground area in the original image;
measuring an average intensity of a central area above the separating line, and decides a weather condition according to the average intensity;
setting a threshold according to the weather condition, and execute a binarization process according to the threshold to an area below the separating line to obtain a binary image, wherein the threshold includes a global threshold and a local threshold, the binarization process comprises:
comparing an intensity of a pixel with the global threshold, and if the intensity of the pixel is smaller than the global threshold, then set the intensity of the pixel to be zero;
else if the intensity of the pixel is greater than the global threshold, then compare an averaging intensity of a surrounding area of the pixel with the local threshold; and
if the average intensity of the surrounding area is smaller than the local threshold, then set the intensity of the pixel to be zero; and
using a line detection method to detect a plurality of approximate lane lines in the binary image.

2. The lane line detection method of claim 1, wherein the separating line is a horizontal straight line.

3. The lane line detection method of claim 1, wherein the weather condition includes daytime, cloudy time, and nighttime.

4. The lane line detection method of claim 1, wherein a size of the surrounding area has a positive correlation with a distance between the pixel and the separating line.

5. The lane line detection method of claim 4, wherein the surrounding area is a square, and a side length of the square is proportional to the distance between the pixel and the separating line.

6. The lane line detection method of claim 1, wherein the line detection method further comprises:
using a second separating line to separate the binary image into a near area and a far area;
using a straight line detection method to obtain a plurality of approximate near lane lines in the near area; and
using a curve line detection method to obtain a plurality of approximate far lane lines in the far area.

7. The lane line detection method of claim 6, wherein the second separating line is a horizontal straight line, and a size of the near area is three times a size of the far area.

8. The lane line detection method of claim 6, wherein the straight line detection method comprises:
detecting a plurality of lane line candidates; and
if two of the lane line candidate intersect with each other at an intersecting point located in a central area of the separating line, then the two of the lane line candidates are determined to be the approximate near lane lines.

9. The lane line detection method of claim 8, wherein if none of the lane line candidates are determined to be the approximate near lane line, then using a plurality of default approximate lane lines to be the approximate near lane lines.

10. The lane line detection method of claim 8, wherein the curve line detection method comprises:
using the intersecting points of the approximate near lane lines and the second separating line to obtain the approximate far lane lines.

11. A lane line detection method, comprising:
acquiring an original image by an image capture device, wherein the original image includes a ground area and a sky area;
setting a separating line between the sky area and the ground area in the original image;
measuring an average intensity of a central area above the separating line, and decides a weather condition according to the average intensity;
setting a threshold according to the weather condition, and execute a binarization process according to the threshold to an area below the separating line to obtain a binary image;
executing a thinning process and an object removing process, which is comprising:
if an intensity of a pixel in the binary image is unequal to zero, then a plurality of sub-pixels is picked which satisfies:
(a). intensity of each sub-pixel is unequal to zero; and
(b). each sub-pixel is horizontally connected to the pixel via other picked sub-pixels;
if a number of picked sub-pixel is out of a standard range, then set the intensities of all the sub-pixels to be zero; and
if the number of picked sub-pixel is within the standard range, then partially set the intensities of the sub-pixels to be zero; and
using a line detection method to detect a plurality of approximate lane lines in the binary image.

12. The lane line detection method of claim 11, wherein the line detection method further comprises:
using a second separating line to separate the binary image into a near area and a far area;
using a straight line detection method to obtain a plurality of approximate near lane lines in the near area; and
using a curve line detection method to obtain a plurality of approximate far lane lines in the far area.

13. The lane line detection method of claim 12, wherein the second separating line is a horizontal straight line, and a size of the near area is three times a size of the far area.

14. The lane line detection method of claim 12, wherein the straight line detection method comprises:
detecting a plurality of lane line candidates; and
if two of the lane line candidate intersect with each other at an intersecting point located in a central area of the separating line, then the two of the lane line candidates are determined to be the approximate near lane lines.

15. The lane line detection method of claim 14, wherein if none of the lane line candidates are determined to be the approximate near lane line, then using a plurality of default approximate lane lines to be the approximate near lane lines.

16. The lane line detection method of claim 14, wherein the curve line detection method comprises:
using the intersecting points of the approximate near lane lines and the second separating line to obtain the approximate far lane lines.

* * * * *